(12) United States Patent
Takahashi et al.

(10) Patent No.: US 10,486,338 B2
(45) Date of Patent: Nov. 26, 2019

(54) PROCESS FOR PRODUCING RESIN-IMPREGNATED FIBER BUNDLE

(71) Applicants: Toray Industries, Inc., Tokyo (JP); Toray Engineering Co., Ltd., Tokyo (JP)

(72) Inventors: Junpei Takahashi, Nagoya (JP); Shigeru Kawashima, Nagoya (JP)

(73) Assignees: Toray Industries, Inc., Tokyo (JP); Toray Engineering Co., Ltd., Tokyo (JP)

(*) Notice: Subject to any disclaimer, the term of this patent is extended or adjusted under 35 U.S.C. 154(b) by 30 days.

(21) Appl. No.: 15/559,275

(22) PCT Filed: Mar. 2, 2016

(86) PCT No.: PCT/JP2016/056360
§ 371 (c)(1),
(2) Date: Sep. 18, 2017

(87) PCT Pub. No.: WO2016/147864
PCT Pub. Date: Sep. 22, 2016

(65) Prior Publication Data
US 2018/0085970 A1 Mar. 29, 2018

(30) Foreign Application Priority Data

Mar. 19, 2015 (JP) .................. 2015-056293

(51) Int. Cl.
*B29B 15/12* (2006.01)
*B05D 1/18* (2006.01)
(Continued)

(52) U.S. Cl.
CPC .............. *B29B 15/125* (2013.01); *B05D 1/18* (2013.01); *B05D 3/12* (2013.01); *B65H 16/00* (2013.01); *B65H 18/08* (2013.01); *D06M 15/19* (2013.01)

(58) Field of Classification Search
CPC ....... B29B 15/122; B29B 15/125; B05D 1/18; B05D 3/12; B65H 81/00
(Continued)

(56) References Cited

U.S. PATENT DOCUMENTS 4,737,383 A * 4/1988 Matsumae ............. B05C 3/125
118/419

FOREIGN PATENT DOCUMENTS

GB 1177050 A * 1/1970 ........... B29B 15/125
JP 52-117964 A 10/1977
(Continued)

*Primary Examiner* — Michael P Wieczorek
(74) *Attorney, Agent, or Firm* — DLA Piper LLP (US)

(57) ABSTRACT

A process for producing a resin-impregnated fiber bundle includes an unwinding step in which a resin-unimpregnated fiber bundle is unwound, a resin impregnation step in which the fiber bundle is passed through an impregnation bath filled with a resin, and an impregnation acceleration step in which after the resin impregnation step, the resin is permeated into the fiber bundle, at least the impregnation acceleration step being performed in a decompression space having a pressure lower than atmospheric pressure. It is possible to produce a resin-impregnated fiber bundle using a decompression space for which decompression can be achieved with a simple device and in which the airtightness is easy to maintain and which has been configured so as to result in satisfactory working efficiency.

13 Claims, 15 Drawing Sheets

(51) Int. Cl.
*B05D 3/12* (2006.01)
*B65H 16/00* (2006.01)
*B65H 18/08* (2006.01)
*D06M 15/19* (2006.01)

(58) Field of Classification Search
USPC ............ 427/172, 177, 179, 294, 296, 350
See application file for complete search history.

(56) References Cited

FOREIGN PATENT DOCUMENTS

| | | |
|---|---|---|
| JP | 52-117965 A | 10/1977 |
| JP | 52-117966 A | 10/1977 |
| JP | 60-240435 A | 11/1985 |
| JP | 05-96539 A | 4/1993 |
| JP | 2002-028924 A | 1/2002 |

* cited by examiner

PROCESS FOR PRODUCING RESIN-IMPREGNATED FIBER BUNDLE

TECHNICAL FIELD

This disclosure relates to a process for producing a resin-impregnated fiber bundle to make a container or the like made of FRP (Fiber Reinforced Plastic).

BACKGROUND

FRP as a composite material made of resin reinforced by reinforcing fibers has been broadly utilized because it can exhibit strength and stiffness equal to or more than that of metal material while it is lighter than metal materials such as iron and aluminum.

Generally, FRP as a raw material comprises fiber bundle of single filaments and resin liquid and, therefore, the fiber bundle and the resin have to be composited in an FRP production process. Such a process might cause a problem that voids remain in final products because of incomplete composite of the fiber bundle and resin. Because voids remaining in products is an important element to control product quality of physical properties such as strength and stiffness and appearance, technologies are being developed to reduce voids from viewpoints of material and process.

Although a process in which resin adheres to and permeates into a fiber bundle is called an impregnation process, a resin-impregnated fiber bundle having desirable production time and porosity can hardly be produced simply by expecting that adhered resin sufficiently permeates into a fiber bundle by capillary action.

Pressure difference is one of the factors influencing resin impregnation ability in a fiber bundle. The impregnation ability can be improved by reducing the pressure of the atmosphere around the fiber bundle in addition to improving pressurization of the impregnating resin because impregnation efficiency is proportional to the pressure difference between the impregnating resin and air existing in the fiber bundle. Accordingly, it has been suggested that atmospheric pressure in a whole or a part of a production process of a resin-impregnated fiber bundle should be reduced to enhance impregnation efficiency.

A method disclosed in JP S60-240435 A to retain a whole production device in a decompression space to produce a resin-impregnated fiber bundle might increase the production cost because of the required strong decompression device to increase the decompression degree in a large decompression space.

A method disclosed in JP H5-96539 A and JP 2002-28924 A to decompress a part of the production process of a resin-impregnated fiber bundle might not keep spaces airtight because of fiber bundles transferring between the decompression space and ordinary pressure space. Although sealing should be achieved with a contact-type structure from a viewpoint of airtightness, fiber bundles passing by the contact-type sealing might fluff the fiber bundle by abrasion to degrade quality while plugging fluff might suspend the operation. Therefore, a noncontact-type sealing is often employed, but it has a poor airtightness so that a strong decompression device is also required to achieve a sufficient decompression degree.

Also, decompression spaces commonly disclosed in JP '435, JP '539 and JP '924 are not configured to consider workability. Namely, productivity might be degraded because devices have to be suspended and disassembled for maintenance for fluff plugging and fibers sticking inside the decompression section irregularly suspend operation.

Accordingly, it could be helpful to provide a process for producing a resin-impregnated fiber bundle, by which decompression is performed by a simple device, the airtightness is easily maintained and the decompression space is configured to have a good workability.

SUMMARY

We thus provide:

(1) A process for producing a resin-impregnated fiber bundle by continuously impregnating with a resin a fiber bundle continuously travelling, comprising: an unwinding step in which a resin-unimpregnated fiber bundle is unwound; a resin impregnation step in which the fiber bundle is passed into an impregnation bath filled with a resin; and an impregnation acceleration step in which the resin is permeated into the fiber bundle after the resin impregnation step, wherein at least the impregnation acceleration step is performed in a decompression space having a pressure lower than atmospheric pressure, and the decompression space has a pressure lower than a pressure in a space to perform the unwinding step and/or the resin impregnation step.

(2) The process for producing a resin-impregnated fiber bundle according to (1), wherein the decompression space is a vacuum.

(3) The process for producing a resin-impregnated fiber bundle according to (1) or (2), wherein the decompression space comprises two or more partition walls sectioned in a direction approximately orthogonal to a travelling direction of the fiber bundle.

(4) The process for producing a resin-impregnated fiber bundle according to (3), wherein an outer surface of the partition wall is provided with a fiber bundle pass-through to supply and/or discharge the fiber bundle.

(5) The process for producing a resin-impregnated fiber bundle according to (3) or (4), wherein an airtight wall structure having a fiber bundle pass-through for the fiber bundle to pass through is provided in the decompression space.

(6) The process for producing a resin-impregnated fiber bundle according to (5), wherein a fiber bundle pass-through provided on an outer surface of the partition has an opening area equal to or less than an opening area of the fiber bundle pass-through in the airtight wall structure.

(7) The process for producing a resin-impregnated fiber bundle according to (5) or (6), wherein one or more vacuum suction ports are provided in the airtight wall structure while one or more vacuum suction ports are provided outside the airtight wall structure, the vacuum ports being provided on the partition wall.

(8) The process for producing a resin-impregnated fiber bundle according to any one of (5) to (7), wherein one or more of the fiber bundle pass-throughs on the partition wall or the airtight wall are not on a plane formed as including the travelling direction of the fiber bundle and a width direction of the fiber bundle pass-through at the most upstream fiber bundle pass-through.

(9) The process for producing a resin-impregnated fiber bundle according to any one of (5) to (8), wherein a tip of an airtight wall forming the fiber bundle pass-through in the airtight wall structure is formed in a fiber bundle guide shape to aim to lead the fiber bundle downstream by contacting the fiber bundle.

(10) The process for producing a resin-impregnated fiber bundle according to any one of (3) to (9), wherein the fiber bundle pass-through is quadrangular.

(11) The process for producing a resin-impregnated fiber bundle according to any one of (3) to (10), wherein a sheet type elastic member for maintaining airtightness is sandwiched on a contact surface between the sectioned partition walls in the decompression space.

(12) The process for producing a resin-impregnated fiber bundle according to (11), wherein the fiber bundle pass-through is formed with the sheet type elastic member, the partition wall and an airtight wall in the decompression space.

(13) The process for producing a resin-impregnated fiber bundle according to any one of (3) to (12), wherein two or more additional yarn guide members sectioned in the direction approximately orthogonal to the travelling direction of the fiber bundle are sandwiched with a pair of the partition wall and an airtight wall to form the fiber bundle pass-through on the additional yarn guide member in the decompression space.

(14) The process for producing a resin-impregnated fiber bundle according to any one of (1) to (13), wherein the impregnation acceleration step comprises a step of passing the fiber bundle onto an impregnation acceleration bar being prevented from rotating.

(15) The process for producing a resin-impregnated fiber bundle according to any one of (1) to (14), wherein the impregnated fiber bundle is wound with a freely movable winding head onto a mandrel rotating around a fixed shaft to make a roll product after passing through the impregnation acceleration step.

We can provide a process for producing a resin-impregnated fiber bundle, by which decompression is performed by a simple device, the airtightness is easily maintained and the decompression space is configured to have a good workability.

EXPLANATION OF SYMBOLS

Figure 1:
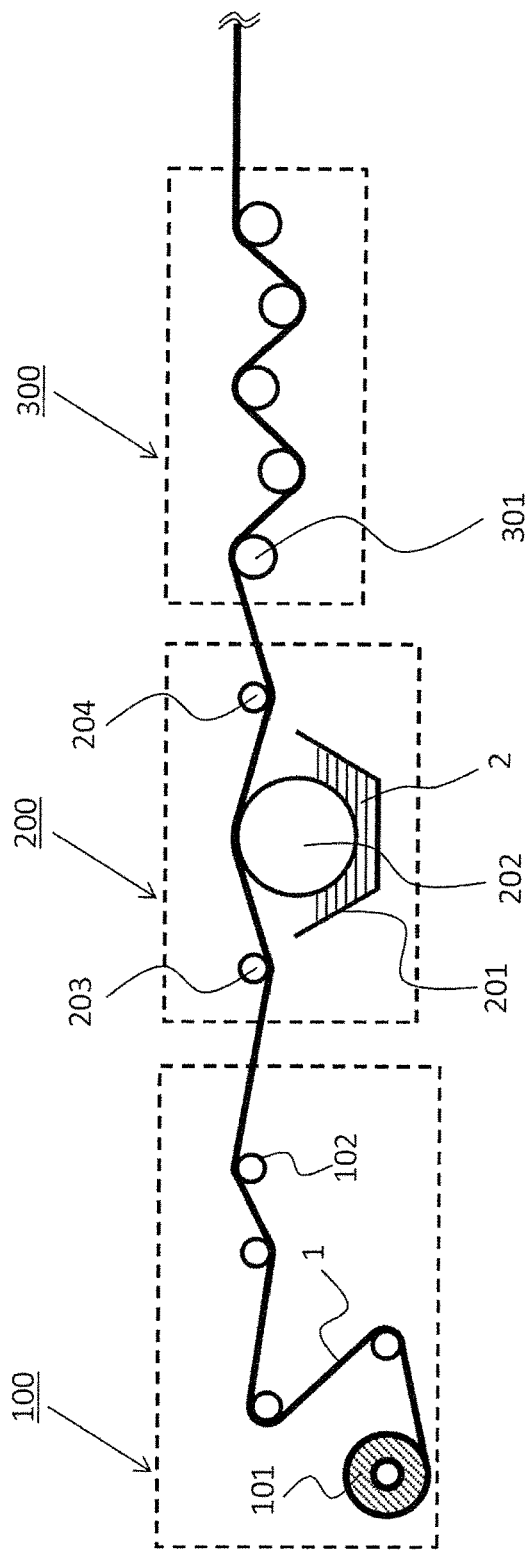
FIG. 1 is a schematic view showing a process for producing our resin-impregnated fiber bundle.

1: fiber bundle
2: resin
100: unwinding step
101: fiber bundle bobbin
102: unwinding roll
200: impregnation step
201: impregnation bath
202: impregnation roll
203: introduction roll
204: discharging roll
300: impregnation acceleration step
301: impregnation acceleration bar
400: decompression space
401: vacuum suction port
402: partition wall 1
403: partition wall 2
404: flange
405: fiber bundle pass-through
406: airtight wall 1
407: airtight wall 2
408: vacuum suction port 1
409: vacuum suction port 2
410: fiber bundle pass-through 1
411: fiber bundle pass-through 2
412: zone
413: centerline 1
414: centerline 2
420: yarn guide member 1
421: yarn guide member 2
450: elastic material for sealing partition wall
451: elastic material 451 for sealing yarn guide member
452: elastic material for fiber bundle guide
500: winding step
501: winding head
502: winding roller
503: mandrel

DETAILED DESCRIPTION

Hereinafter, processes will be explained in detail.

Process Summary

With reference to the process shown in FIG. 1, our process for producing a resin-impregnated fiber bundle will be explained. The production process comprises unwinding step 100 to unwind a resin-unimpregnated fiber bundle, resin impregnation step 200 to pass the fiber bundle through an impregnation bath filled with resin, and impregnation acceleration step 300 to make the resin permeate the fiber bundle.

Unwinding Step

Unwinding step 100 comprises fiber bundle bobbin 101 and unwinding roll 102.

Unwinding Roll

Each production device is provided with a suitably selected number of unwinding rolls 102 to lead fiber bundle 1 that has been unwound from fiber bundle bobbin 101 to impregnation step 200 from viewpoints of production facility layout constraint and economic efficiency. The axial direction of unwinding roll 102 should be orthogonal to the travelling direction of fiber bundle and may be parallel, orthogonal or skewed to the axial direction of fiber bundle bobbin 101.

Fiber

A single or plurality of kinds of inorganic or organic fiber may be employed as a reinforcing fiber used in the production process. The inorganic fiber may be a glass fiber which is a general reinforcing fiber of FRP fibers while the organic fiber may be carbon fiber or aramid fiber.

Impregnation Step

Impregnation step 200 comprises impregnation bath 201 to retain resin 2, introduction roll 203, resin impregnation roll 202 and discharging roll 204.

Function of Impregnation Bath

According to examples with an impregnation roll shown in the figures, fiber bundle 1 passes through introduction roll 203, impregnation roll 202 and discharging roll 204, and is led to the next impregnation acceleration step 300. Impregnation bath 201 is filled with resin 2 so that impregnation roll 202 is dipped into resin 2 to put the resin on the roll. As a result, resin 2 adheres to fiber bundle 1 traveling on impregnation roll 202 to impregnate the resin into fiber bundle.

Introduction/Discharging Roll

FIG. 1 shows an example in which each single introduction roll 203 and discharging roll 204 are provided although each plurality of rolls may be provided as a roll group. It is preferable that the rotation axes of introduction roll 203, impregnation roll 202 and discharging roll 204 are parallel to prevent fiber bundle 1 from being distorted and folded, although various positional relations of rolls are available.

Other Impregnation Means

The above-described impregnation step of impregnation roll type is illustrative only. For example, various alternatives are available such as dip type to dip the fiber bundle directly in the resin and constant discharge type in which the fiber bundle is fed into an impregnation die into which weighed resin is discharged so that a predetermined amount of resin adheres to and impregnates the fiber bundle.

Resin

Resin 2 may be a thermosetting resin such as epoxy and unsaturated polyester or a thermoplastic resin such as polyamide, depending on final product usage, usage environment and required specifications, although various alternatives are available. From viewpoints of workability and energy consumption, it is preferable to employ a thermosetting resin such as epoxy resin so that the impregnation step is performed at a low resin temperature.

Resin Viscosity

Although the viscosity of the impregnating resin should be lower from a viewpoint of impregnation efficiency, the viscosity should be at a proper level to maintain a predetermined resin content by preventing the resin from dripping before impregnating sufficiently into the fiber bundle. Specifically, the viscosity is preferably 10 to 2,000 mPa·s. It is more preferable that the viscosity is 100 to 1,100 mPa·s.

Impregnation Acceleration Step

It is preferable that impregnation acceleration step 300 comprises a plurality of impregnation acceleration bars 301 although various alternatives are available. It is preferable that impregnation acceleration bar 301 is prevented from rotating around the bar axis.

Function of Impregnation Acceleration Bar

Fiber bundle 1 passes through the step zigzag as hooked with impregnation acceleration bars 301. Generally, in production process of the resin-impregnated fiber bundle, tension is applied to fiber bundle 1 so that fiber bundle 1 receives thickness-directional reactive force from impregnation acceleration bar 301 when passing through impregnation acceleration bar 301. The reactive force can accelerate an impregnation (permeation) of the fiber bundle with resin 2 adhering to fiber bundle 1 so that voids of fiber bundle 1 are filled with resin 2.

Process Speed

It is preferable that fiber bundle 1 travels at a speed of 0.1-300 m/min from a viewpoint of productivity. Too high a speed might deteriorate product quality because of insufficient impregnation time. In addition, troubles such as yarn breakage might be caused by insufficient maintenance because the fiber bundle has increased travel resistance and fluffs generated by increased travelling fiber amount per unit time.

Definition of Decompression

Decompression space 400 will be explained in detail. "Decompression" means a pressure reduction below atmospheric pressure of the neighboring space. It is preferable that a decompression degree indicated by an inner pressure of the decompression space is 0 to 750 mmHg. It is more preferable that it is a vacuum (0 mmHg to 76 mmHg) so that impregnation is further accelerated.

Zone Occupied by Decompression Space

Figure 2:
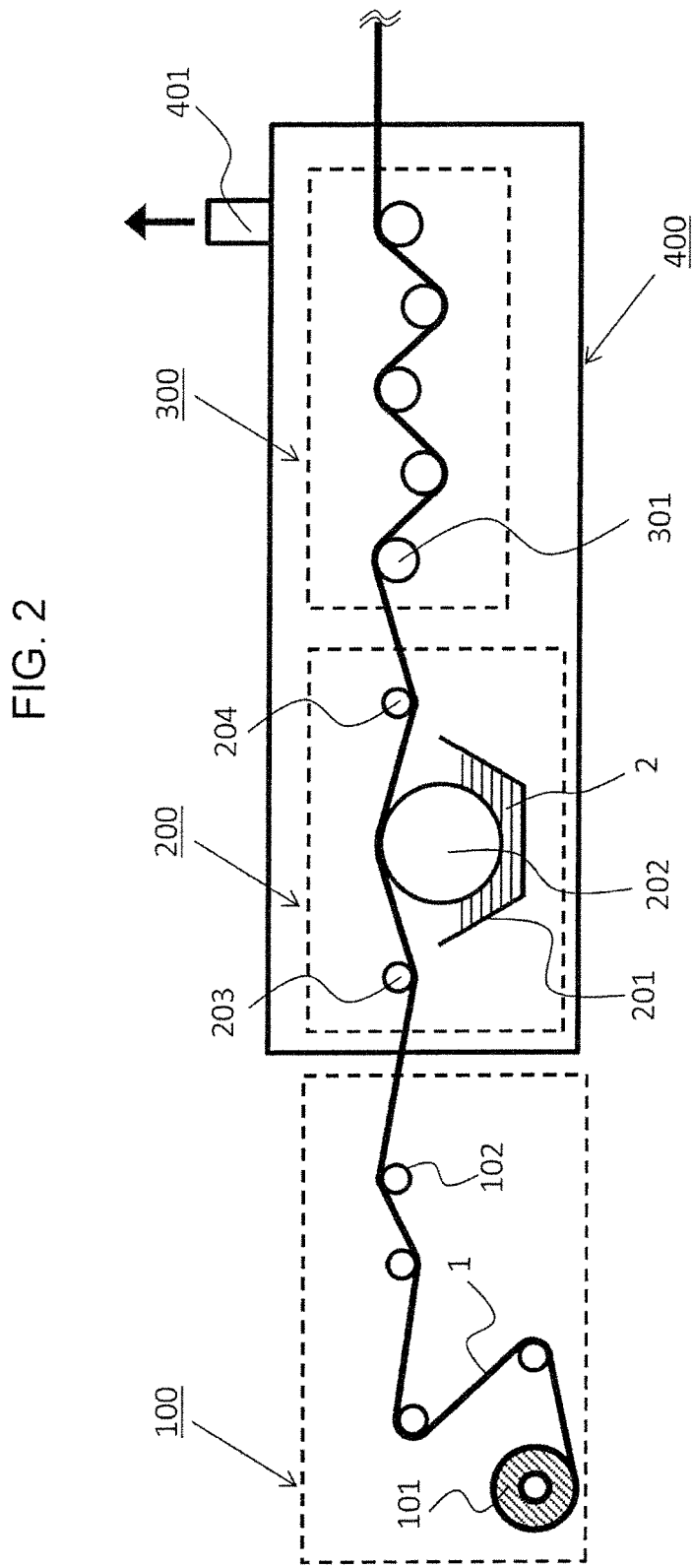
FIG. 2 is a schematic view showing an example of production process with decompression zone.
Figure 3:
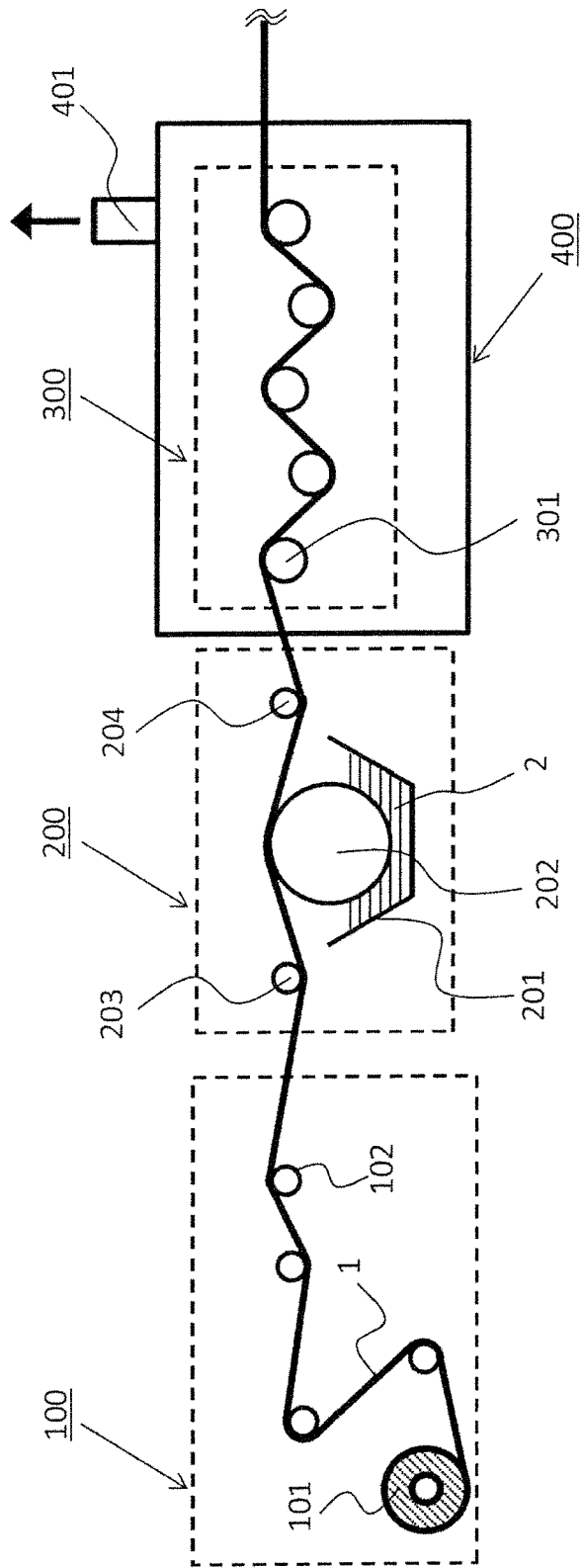
FIG. 3 is a schematic view showing another example of production process with decompression zone.

The zone occupied by decompression space 400 should include impregnation acceleration step 300. As shown in FIG. 2, the decompression space may further include impregnation step 200 or further include unwinding step 100 (not illustrated). Alternatively, it may include impregnation acceleration step 300 only as shown in FIG. 3.

Effect by Decompression

Decompression in the step increases the pressure difference between pressure of resin 2 to impregnate and air pressure remaining in fiber bundle 1. As a result, a resin-impregnated fiber bundle has few voids because of accelerated impregnation. Particularly, resin impregnation acceleration step 300, which greatly contributes to resin impregnation, is performed at a reduced pressure to efficiently improve the impregnation efficiency.

Decompression Means

Decompression means to provide decompression space 400 may be a generally available vacuum pump (not illustrated) to suck out the air through vacuum suction port 401 in the decompression space as shown in FIGS. 2 to 4 although various alternatives are available.

Decompression Space

Figure 4A:
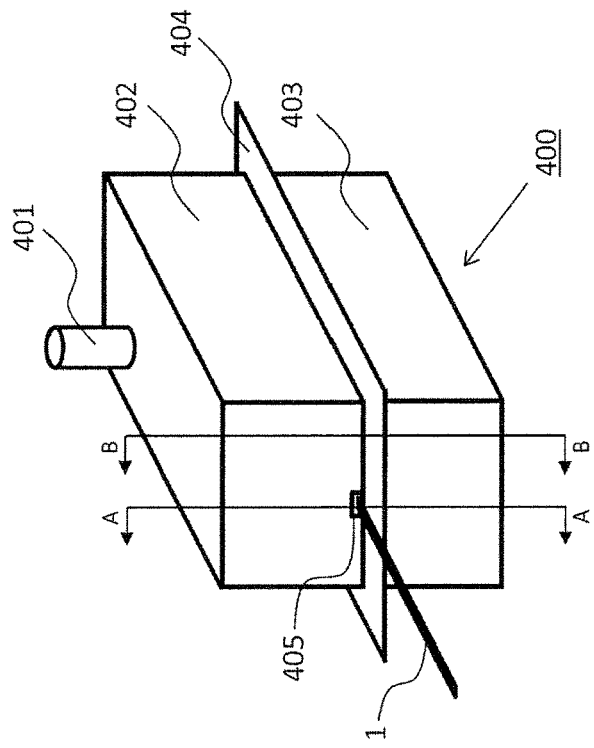
FIGS. 4A and 4B are perspective views showing examples of decompression space.
Figure 4B:
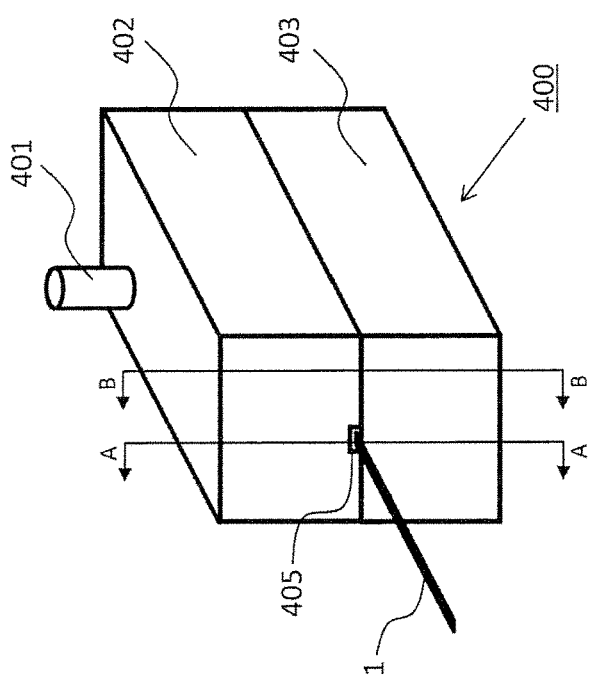

Desirable compression space partition wall to form decompression 400 will be explained in detail. FIGS. 4A and 4B are perspective views showing an example.

Figure 6:
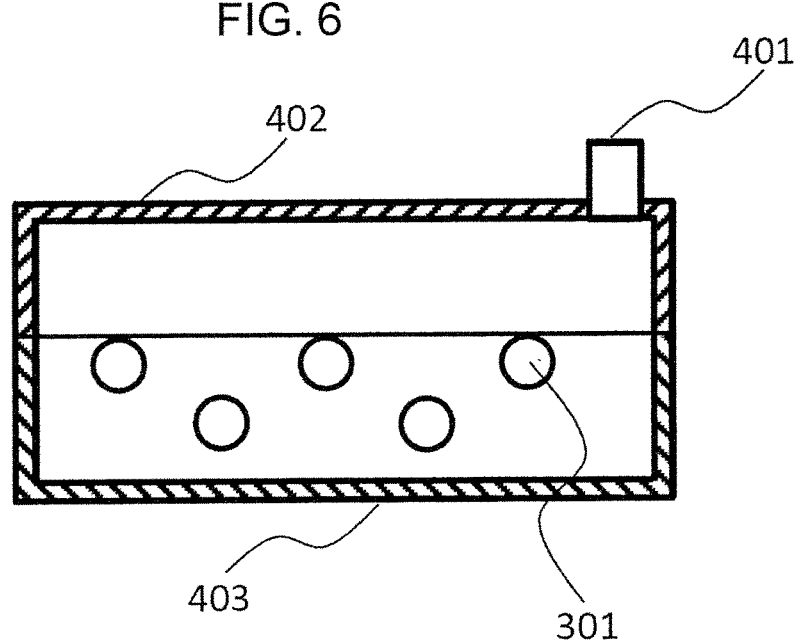
FIG. 6 is cross sectional view showing another example of decompression space.
Figure 7A:
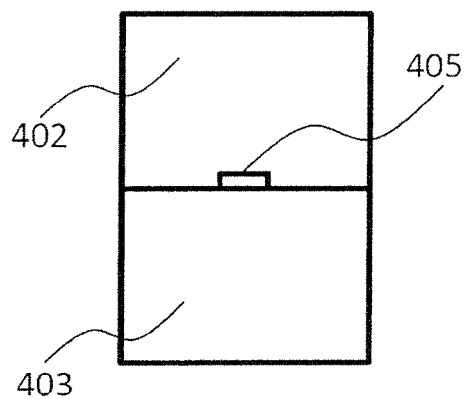
FIGS. 7A-7D are front views showing examples of pass-throughs for fiber bundle on a partition wall of decompression space.
Figure 7B:
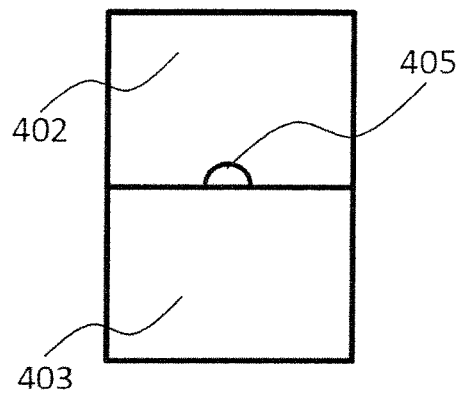
Figure 7C:
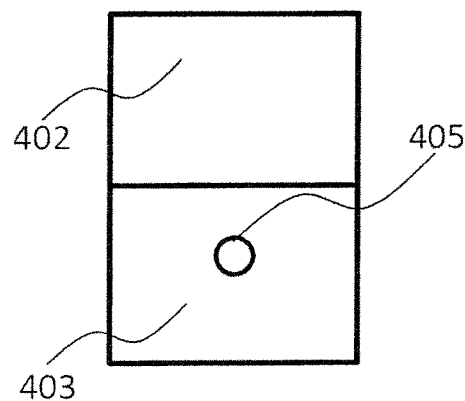
Figure 7D:
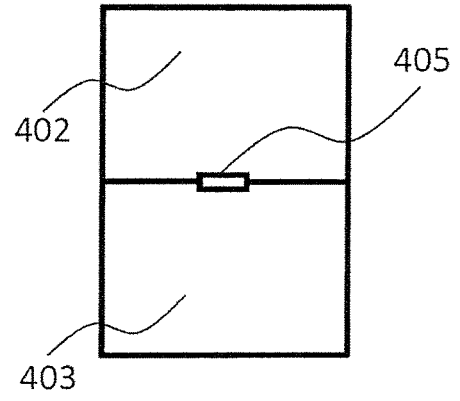

Decompression space 400 is isolated from the outer space to keep the inner space decompressed by partition walls 402 and 403 which can be sectioned in a direction approximately orthogonal to the travelling direction of the fiber bundle. The outer surface of partition walls 402 and 403 is provided with fiber bundle pass-through 405 which may be an entrance to introduce fiber bundle 1 into decompression space 400 or exit to discharge the fiber bundle out of decompression space 400. At least one of partition walls 402 and 403 is provided with at least one of vacuum suction port 401 to provide the decompression space. As shown in FIG. 6, decompression space 400 should include at least an impregnation acceleration means (corresponding to impregnation acceleration bars 301 in the example).

Space Partition Wall

Materials and the dimensions of partition walls 402 and 403 can be selected freely as depending on desirable decompression degree and content. It is preferable that the walls have a minimum size corresponding to inner content so that decompression degree is improved efficiently.

Section Structure of Partition Wall

To keep the space airtight, it is preferable that a seal structure is provided on a fastening surface to fasten partition walls 402 and 403 facing each other. As shown in FIGS. 4A and 4B, partition walls 402 and 403 may be provided with each of flanges 404 between which a gasket is inserted to fasten them. The number of sectioned partition walls should be fewer like the 2-sectioned structure shown in FIGS. 4A and 4B so that airtightness is easily maintained and decompression degree is improved efficiently in the decompression space, although various alternatives are available.

Gasket

It is preferable to employ a gasket made of an elastic material having an adequate elasticity without harmful effect on products caused by reacting with resin 2 and damaging fiber bundle 1 when contacting fiber bundle 1, although various alternatives are available to the extent that the decompression space is kept airtight. The elastic material may be a silicone rubber of adequate elasticity and workability, preferably having a thickness of 0.2 to 10 mm and a hardness of 20 to 90 degrees.

Effect by Section Structure

The decompression space partition wall to be easily sectioned can improve in productivity because troubleshooting becomes easy in case of a shutdown caused by fibers sticking around impregnation acceleration bar 301 installed in the decompression space and fluff plugging in fiber bundle pass-through 405.

Fiber Bundle Pass-Through 405

Figure 5:
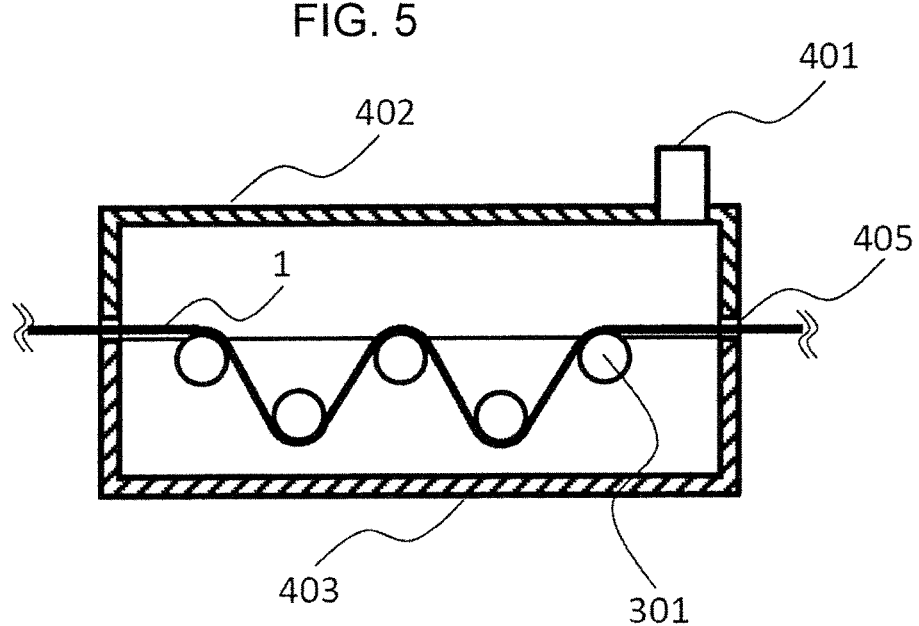
FIG. 5 is a cross sectional view showing the example of decompression space.

It is preferable that fiber bundle pass-through 405 has a minimum opening area just enough for fiber bundle 1 to pass through both entrance and exit as shown in FIG. 5. Further, it is preferable that a zone that doesn't include fiber bundle pass-through 405 is not provided with an opening like the fiber bundle pass-through as shown in FIG. 6. As a result, the decompression degree in decompression space 400 can be maintained greater because only fiber bundle pass-through 405 communicates with the outer space.

Figure 8A:
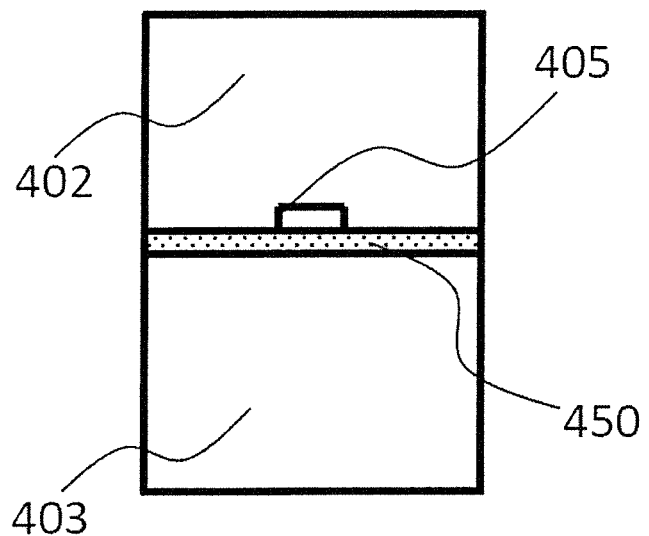
FIGS. 8A and 8B are front views showing examples of pass-throughs for fiber bundle on a partition wall of decompression space.
Figure 8B:
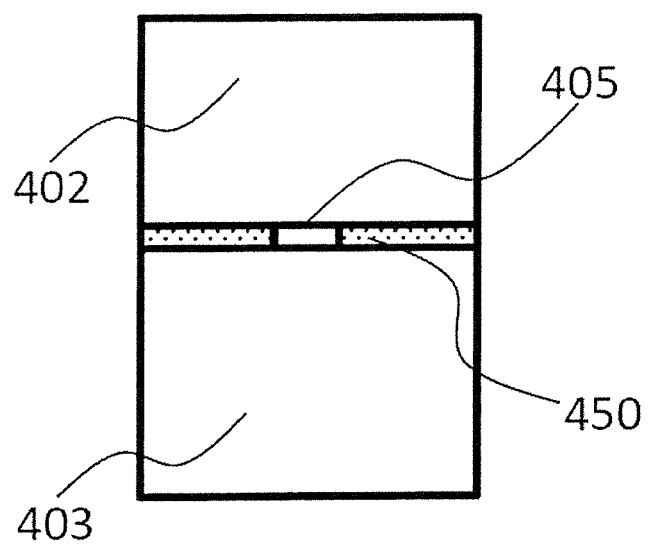

The fiber bundle pass-through 405 may have any shape to the extent of allowing fiber bundle 1 to pass through. As shown in FIGS. 7A-7D, it is possible that any one of partition walls 402 and 403 has a notch or a hole of which shape is rectangular or circular. Alternatively, fiber bundle pass-through 405 may be formed as combined with notches each provided on partition walls 402 and 403. As shown in FIGS. 8A and 8B, it is possible that fiber bundle pass-through 405 is formed with elastic material 450 for sealing partition wall introduced to improve airtightness.

Introduction of Yarn Guide Member

Figure 9A:
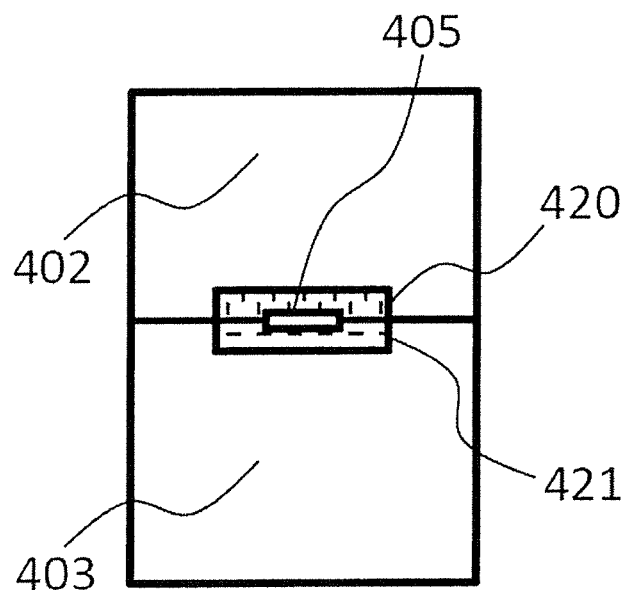
FIGS. 9A and 9B are front views showing examples of pass-throughs for fiber bundle on a partition wall of decompression space.
Figure 9B:
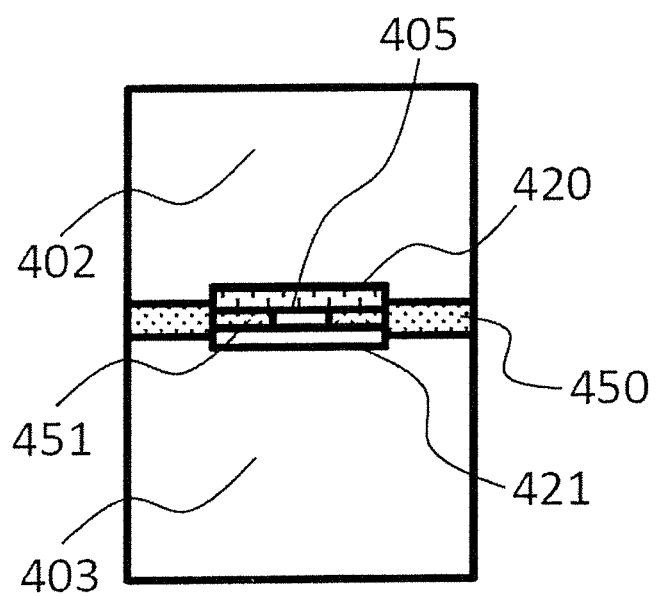

As shown in FIGS. 9A and 9B, it is possible that yarn guide members 420 and 421 are sandwiched by partition walls 402 and 403 to form fiber bundle pass-through 405 on yarn guide members 420 and 421. To improve productivity, it is preferable that yarn guide members 420 and 421 can be sectioned like partition walls 402 and 403. To improve airtightness, it is possible that elastic material 451 to seal the yarn guide member is inserted between yarn guide members 420 and 421. The notch surrounding yarn guide members 420 and 421 provided on partition walls 402 and 403 has a size, which is just enough to surround yarn guide members 420 and 421 only or which is just enough to surround elastic material 450 to seal the partition wall sandwiched thereby.

The same approach as partition walls 402 and 403 can be applied to fiber bundle pass-through 405 provided on yarn guide members 420 and 421. Namely, fiber bundle pass-through 405 can be formed by yarn guide members 420 and 421, any one of which has a notch or a hole, or alternatively both of which have a notch. Also, it is possible that fiber bundle pass-through 405 is formed together with elastic material 451 for sealing yarn guide member.

By employing yarn guide members 420 and 421, the fiber bundle pass-through having high dimension accuracy can be formed by processing with accuracy relative to partition walls 420 and 403 which are generally larger than yarn guide members 420 and 421.

Desirable Range of Opening Area

From a viewpoint of fluff generation prevention, it is important that fiber bundle pass-through 405 and fiber bundle 1 should be non-contact type. It is preferable that fiber bundle pass-through 405 has 1.2 to 20 times the width and thickness of fiber bundle. Such a minimum opening area can minimize inflow of external air leak through fiber bundle pass-through 405 into decompression space 400 to enhance airtightness. Also, the airtightness is expected to be further improved by sealing the gap with resin between fiber bundle 1 and fiber bundle pass-through 405 because resin 2 adhering to fiber bundle in impregnation step 200 tends to adhere to a boundary part of fiber bundle pass-through 405.

Airtight Wall

Figure 10:
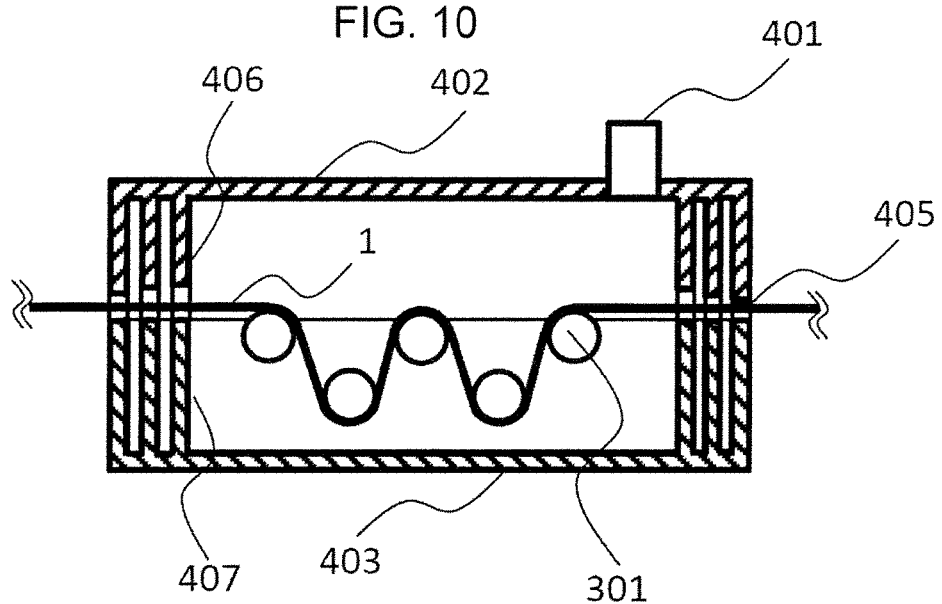
FIG. 10 is a cross sectional view showing an example with an airtight wall in the decompression space.
Figure 11:
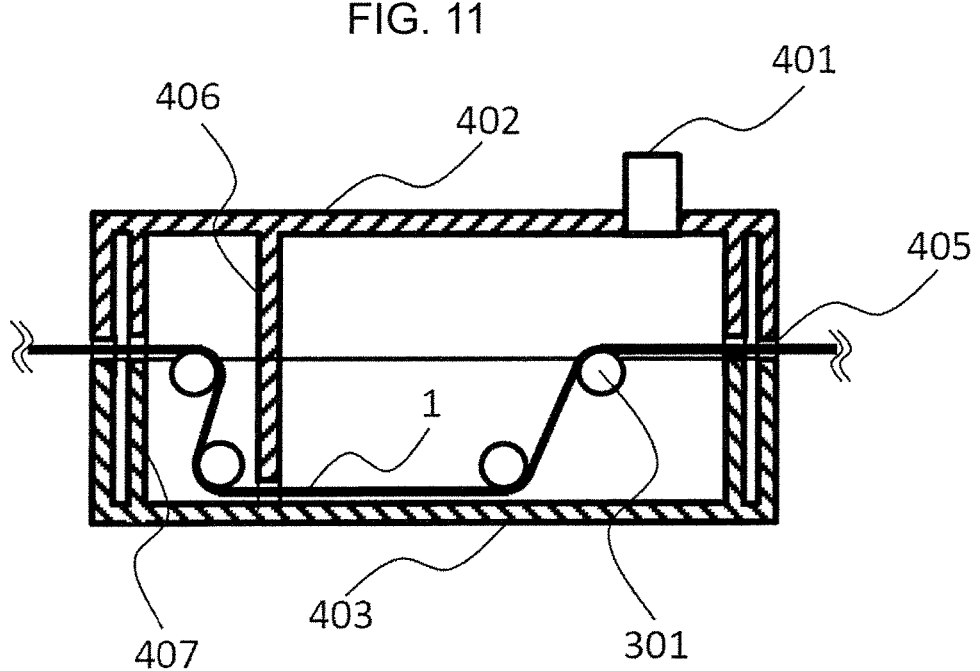
FIG. 11 is a cross sectional view showing another example with an airtight wall in the decompression space.
Figure 12A:
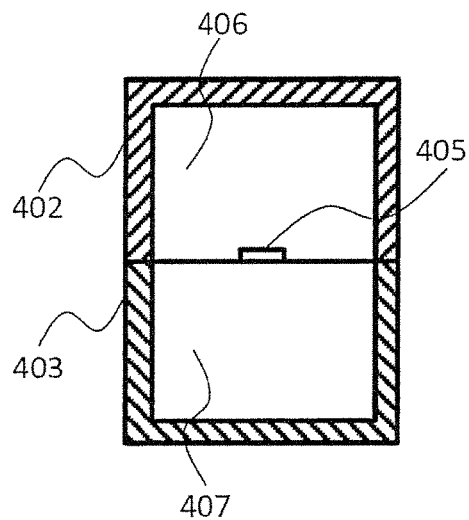
FIGS. 12A-12D are front views showing examples of pass-throughs for fiber bundle on the airtight wall.
Figure 12B:
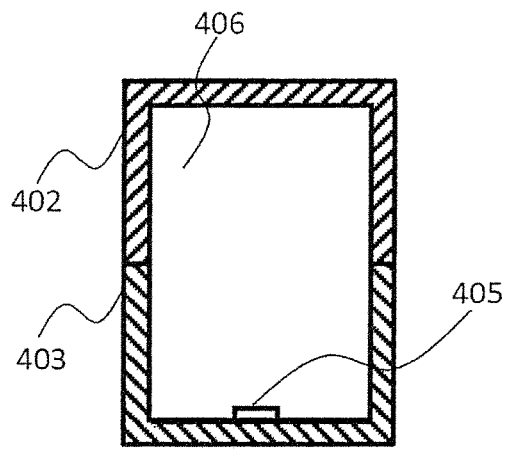
Figure 12C:
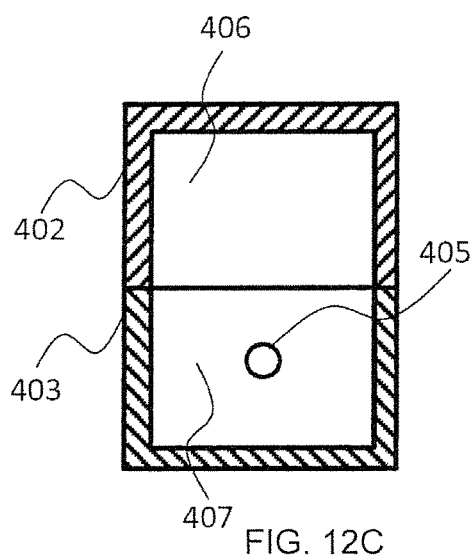
Figure 12D:
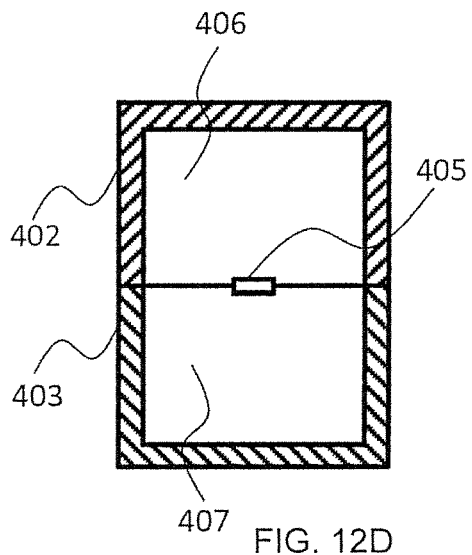

To enhance the decompression degree in the decompression space, it is preferable that a plurality of airtight walls 406 and 407 are provided in decompression space 400. Airtight walls 406 and 407 may be provided as extending from both sides of partition walls 402 and 403 as shown in FIG. 10. Alternatively, airtight wall 406 may be provided as extending from partition wall 402 only as shown in FIG. 11. The number of airtight walls is selected freely depending on inner content and desirable decompression degree.

Fiber Bundle Pass-Through on Airtight Wall

Figure 13A:
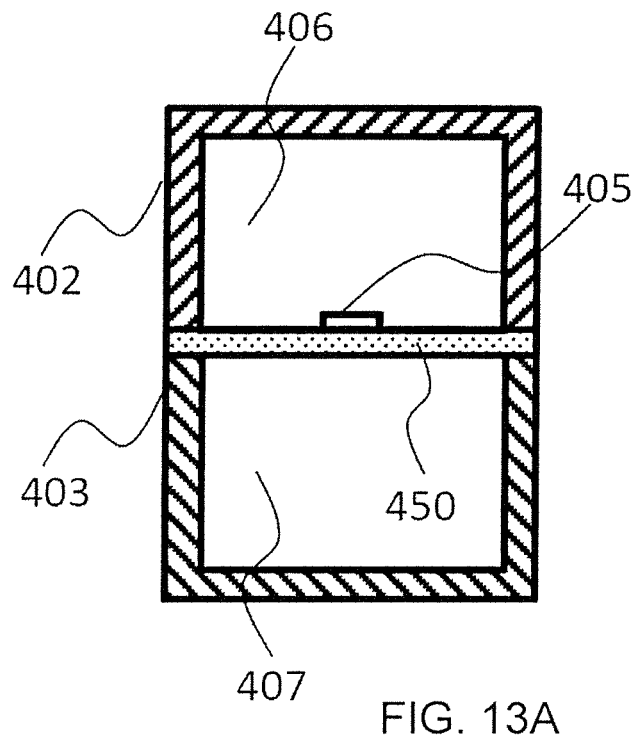
FIGS. 13A and 13B are front views showing examples of pass-throughs for fiber bundle on the airtight wall.
Figure 13B:
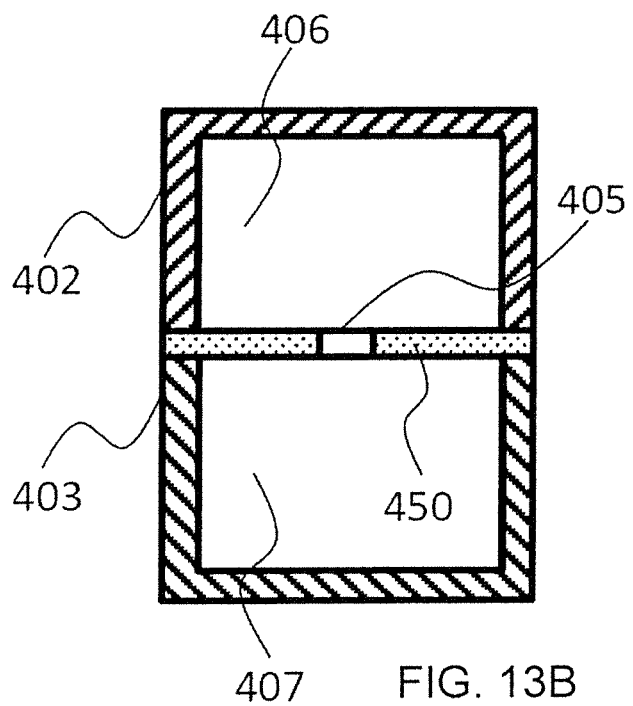

It is preferable that fiber bundle pass-through 405 for the fiber bundle to pass through is provided on airtight walls 406 and 407. It is preferable that the size of the opening is decided based on the same approach as partition walls 402 and 403. Specifically, it is preferable that fiber bundle pass-through 405 has a minimum opening area just enough for fiber bundle 1 to pass through while a zone having no fiber bundle pass-through 405 has no opening to minimize the opening area from a viewpoint of maintaining airtightness. As shown in FIGS. 12A-12D, the fiber bundle pass-through can be formed by a notch or a hole on airtight wall 406, or alternatively be formed as striding across airtight walls 406 and 407. As shown in FIGS. 13A and 13B, fiber bundle pass-through 405 may be formed with elastic material 450 for sealing partition wall introduced for improving airtightness.

Yarn Guide Material Insertion

Figure 14A:
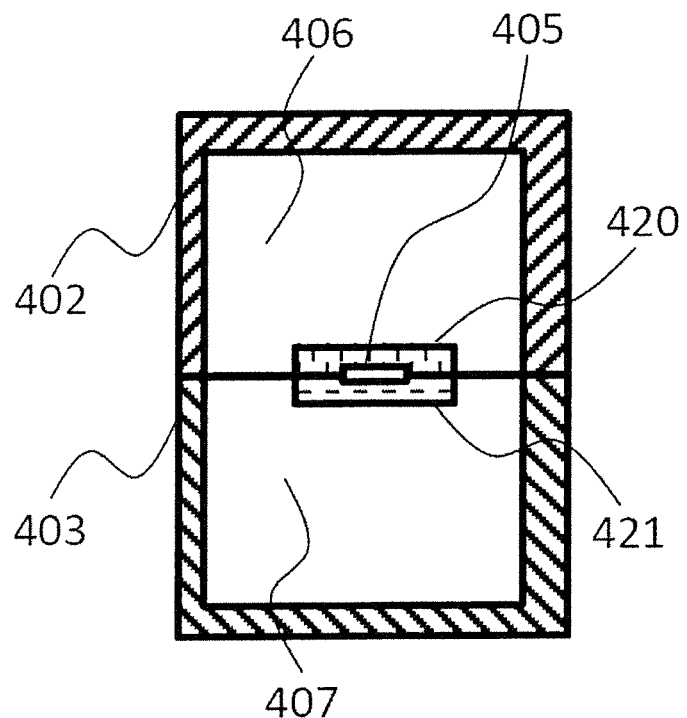
FIGS. 14A and 14B are front views showing examples of pass-throughs for fiber bundle on the airtight wall.
Figure 14B:
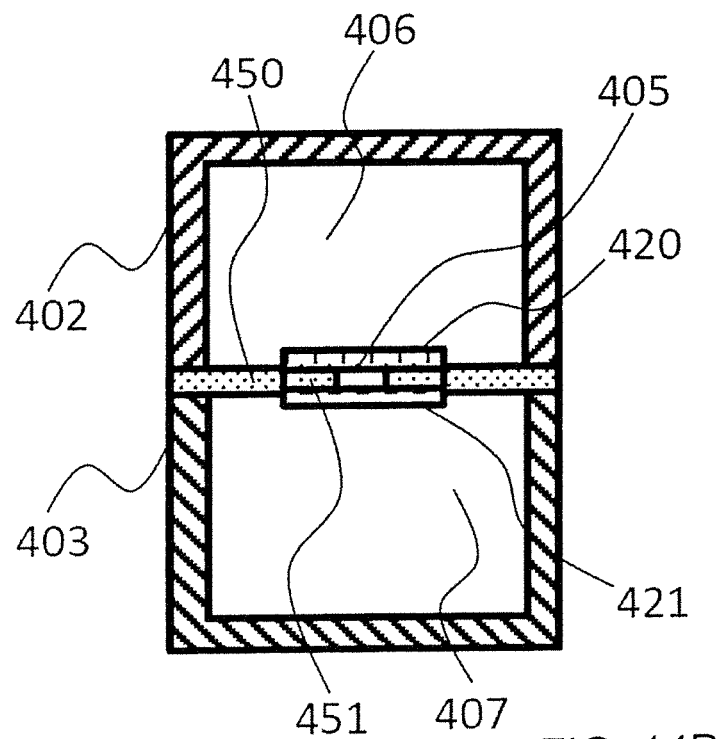
Figure 15:
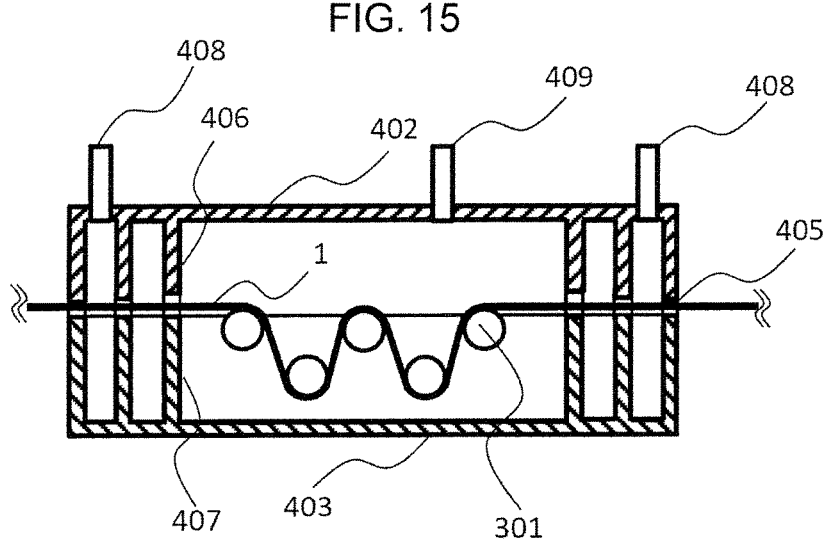
FIG. 15 is a cross sectional view showing a layout of suction port in the example with the airtight wall in the decompression space.
Figure 16:
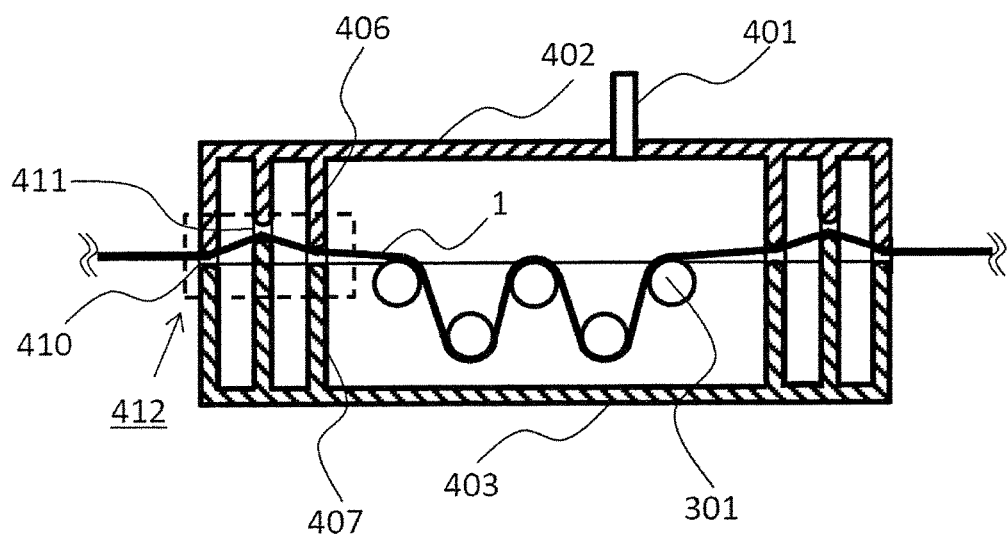
FIG. 16 is a cross sectional view showing a layout of the fiber bundle pass-through in the example with the airtight wall in the decompression space.
Figure 17A:
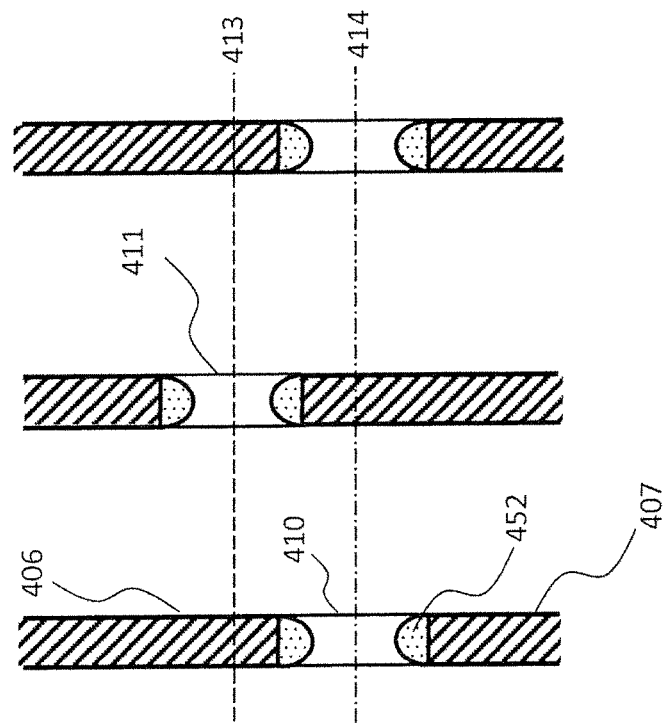
FIGS. 17A and 17B are partial enlarged views of zone 412 in FIG. 16.
Figure 17B:
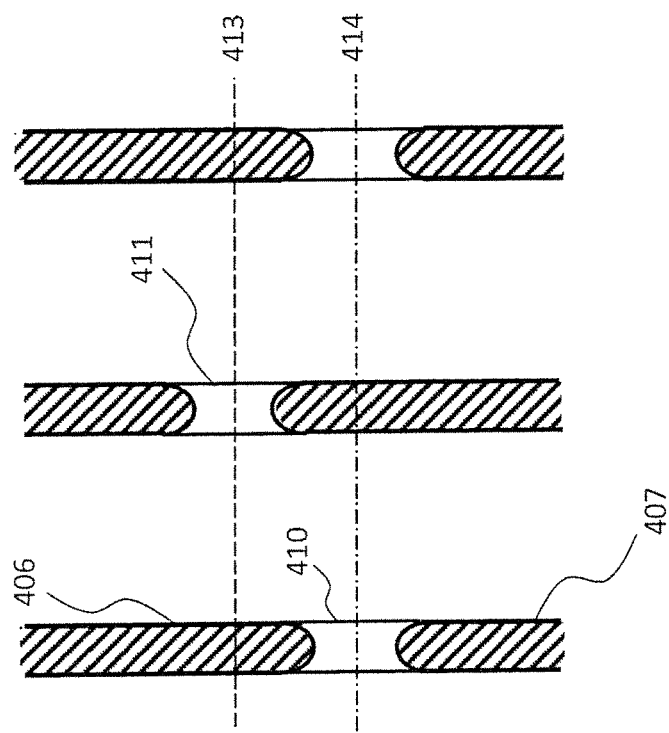

The same approach can be applied to a configuration inserting yarn guide materials 420 and 421. As shown in FIGS. 14A and 14B, the notch surrounding yarn guide members 420 and 421 provided on airtight walls 406 and 407 has a size, which is just enough to surround yarn guide members 420 and 421 only or just enough to surround elastic material 450 to seal the partition wall sandwiched thereby.
Effect by Airtight Wall
With airtight walls 406 and 407, a communicating zone between the outer space and neighborhood of inner content decreases and air inflow resistance increases so that decompression degree in the neighborhood of inner content is improved to improve impregnation efficiency.
Opening Area Relation Between Airtight Wall and Partition Wall, and Suction Port Layout
Openings of fiber bundle pass-through 405 provided on partition walls 402 and 403 and airtight walls 406 and 407 may have the same area. Alternatively, the opening area may increase toward the center of decompression space 400 as starting from the minimum opening area of fiber bundle pass-through 405 provided on partition walls 402 and 403. The airtightness can be maintained by designing the smaller opening area for a zone closer to the outer space. Although fluff tends to accumulate on a smaller opening, the accumulated fluff can easily be removed in good maintenance efficiency when the smaller opening is provided at the side of outer space.
When one or more vacuum suction ports 408 are provided in the airtight wall structure while one or more vacuum suction ports 409 are provided outside the airtight wall structure as shown in FIG. 15, air inflow from outer space can be suppressed effectively to improve decompression degree.
Zigzag Layout of Fiber Bundle Pass-Through
To effectively suppress air inflow from the outer space to improve decompression degree, it is preferable that one or more fiber bundle pass-throughs 411 are not in a plane formed as including fiber bundle travelling direction and fiber bundle pass-through width direction at the most upstream fiber bundle pass-through 410 among all fiber bundle pass-throughs 405 provided on partition wall 402 or 403, airtight wall 406 or 407, or yarn guide material 420 or 421 as shown in FIG. 16. Such a configuration corresponds to the configurations with different centerlines 413 and 414 shown in FIGS. 17A and 17B as enlarged views of zone 412 in FIG. 16.
With such a configuration, it is preferable that contact part is formed in a fiber bundle guide shape to aim to lead the fiber bundle downstream in the process as preventing the fiber bundle from being hooked or damaged, because of unavoidable travelling of fiber bundle 1 while contacting a part of the fiber bundle pass-through. For example, it is preferable that airtight walls 406 and 407 are formed in a shape having a round tip as shown in FIG. 17, and have an arithmetic average surface roughness Ra of 0.6 to 25. Alternatively, it is possible to provide elastic material 452 for guiding fiber bundle.
Elastic Material to Guide the Fiber Bundle
Just like elastic material 450 to seal the partition wall and elastic material 451 to seal the yarn guide described above, it is preferable to employ elastic material to guide the fiber bundle made of an elastic material having an adequate elasticity without harmful effect on products caused by reacting with resin 2 and damaging fiber bundle 1 when contacting fiber bundle 1. The elastic material may be a silicone rubber of adequate elasticity and workability, preferably having a thickness of 0.2 to 10 mm and a hardness of 20 to 90 degrees. The elastic material may be formed integrally with elastic material 450 for sealing partition wall or elastic material 451 for sealing yarn guide member.

Figure 18:
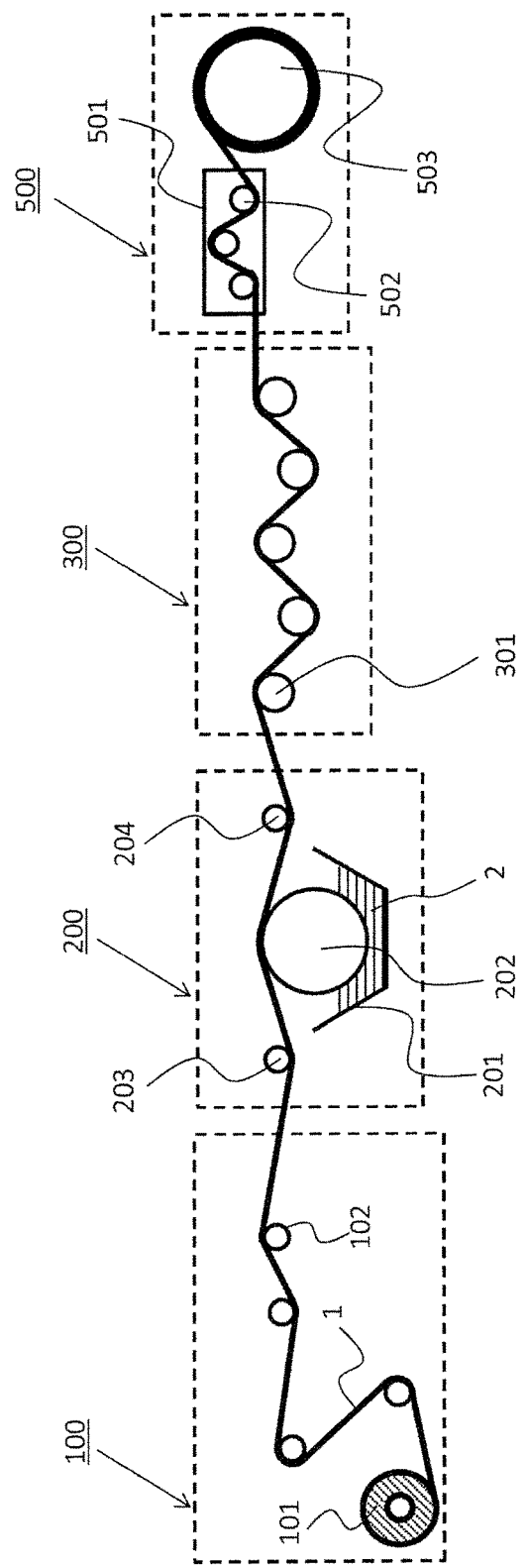
FIG. 18 is a schematic view showing a process for producing a roll of our resin-impregnated fiber bundle.

Usage After Passing Through Production Process
A resin-impregnated fiber bundle produced through our production process can be processed in various ways to make final products. For example, the impregnating resin may further be processed to make semihard to prepare a prepreg to be wound temporarily around a bobbin which can be set to an apparatus that produces a roll of another resin-impregnated fiber bundle to make a final product.
Winding Step
As shown in FIG. 18, a roll of resin-impregnated fiber bundle may be produced in winding step 500 after impregnation acceleration step 300 in the same process. Winding step 500 comprises: winding head 501 provided to each mandrel; a plurality of winding rollers 502 provided in the winding head; and mandrel 503 as an object to wind.
Operation Summary of Winding Step
Fiber bundle 1 after passing through resin impregnation acceleration step passes through winding roller 502 fixed on winding head 501 and is wound up. Winding head 501 freely moves relative to mandrel 503 rotatable around a shaft fixed in a space according to settings of winding amount and winding angle of the fiber bundle designed to meet required specification of roll so that a roll of the resin-impregnated fiber bundle is wound on the mandrel to make a product.
After Winding Step
After the winding step, the roll of resin-impregnated fiber bundle passes through a resin curing step and a finishing step including additional processing such as trimming of remnants to make a final product. The curing step may be performed in the same place as the winding step without moving or, alternatively, may be performed in a different place shifted from the winding step.

INDUSTRIAL APPLICATIONS

Our resin-impregnated fiber bundle is widely applicable as materials for fiber reinforced plastic container or the like.
The invention claimed is:
1. A process for producing a resin-impregnated fiber bundle by continuously impregnating with a resin a fiber bundle continuously travelling, comprising:
 an unwinding step in which a resin-unimpregnated fiber bundle is unwound;
 a resin impregnation step in which the fiber bundle is passed into an impregnation bath filled with a resin; and
 an impregnation acceleration step in which the resin is permeated into the fiber bundle after the resin impregnation step, wherein
 at least the impregnation acceleration step is performed in a decompression space having a pressure lower than atmospheric pressure,
 the decompression space comprises two or more partition walls sectioned in a direction approximately orthogonal to a travelling direction of the fiber bundle and has a pressure lower than a pressure in a space to perform the unwinding step and/or the resin impregnation step, and
 an airtight wall structure having a fiber bundle pass-through for the fiber bundle to pass through is provided in the decompression space,
 wherein one or more vacuum suction ports are provided in the airtight wall structure while one or more additional vacuum suction ports are further provided outside the airtight wall structure, the one or more vacuum suction ports and one or more additional vacuum suction ports being provided on at least one of the two or more partition walls.
2. The process according to claim 1, wherein the decompression space is a vacuum.

3. The process according to claim 1, wherein an outer surface of the two or more partition walls is provided with a fiber bundle pass-through to supply and/or discharge the fiber bundle.

4. The process according to claim 1, wherein a fiber bundle pass-through provided on an outer surface of one of the two or more partition walls has an opening area equal to or less than an opening area of the fiber bundle pass-through in the airtight wall structure.

5. The process according to claim 4, wherein one or more fiber bundle pass-throughs are provided on at least one of the two or more partition walls, and the fiber bundle pass-throughs on the two or more partition walls or the airtight wall structure are not on a plane formed as including the travelling direction of the fiber bundle and a width direction of the fiber bundle pass-through at the most upstream fiber bundle pass-through.

6. The process according to claim 1, wherein a tip of an airtight wall forming the fiber bundle pass-through in the airtight wall structure is formed in a fiber bundle guide shape to lead the fiber bundle downstream by contacting the fiber bundle.

7. The process according to claim 1, wherein the fiber bundle pass-through is quadrangular.

8. The process according to claim 1, wherein a sheet type elastic member that maintains airtightness is sandwiched on a contact surface between the two or more partition walls in the decompression space.

9. The process according to claim 8, wherein the fiber bundle pass-through is formed with the sheet type elastic member, two or more partition walls and an airtight wall in the decompression space.

10. The process according to claim 1, wherein two or more additional yarn guide members sectioned in the direction approximately orthogonal to the travelling direction of the fiber bundle are sandwiched with the two or more partition walls and an airtight wall to form the fiber bundle pass-through in the decompression space.

11. The process according to claim 1, wherein the impregnation acceleration step comprises a step of passing the fiber bundle onto an impregnation acceleration bar that is prevented from rotating.

12. The process according to claim 1, wherein the impregnated fiber bundle is wound with a freely movable winding head onto a mandrel rotating around a fixed shaft to make a roll product after passing through the impregnation acceleration step.

13. A process of producing a resin-impregnated fiber bundle by continuously impregnating with a resin a fiber bundle continuously travelling, comprising:

an unwinding step in which a resin-unimpregnated fiber bundle is unwound;

a resin impregnation step in which the fiber bundle is passed into an impregnation bath filled with a resin; and an impregnation acceleration step in which the resin is permeated into the fiber bundle after the resin impregnation step, wherein at least the impregnation acceleration step is performed in a decompression space having a pressure lower than atmospheric pressure, the decompression space comprises two or more partition walls sectioned in a direction approximately orthogonal to a travelling direction of the fiber bundle and has a pressure lower than a pressure in a space to perform the unwinding step and/or the resin impregnation step, an airtight wall structure having a fiber bundle pass-through for the fiber bundle to pass through is provided in the decompression space, and one or more fiber bundle pass-throughs are provided on at least one of the two or more partition walls;

wherein one or more of the fiber bundle pass-throughs provided on the two or more partition walls or the airtight wall structure are not on a plane formed as including the travelling direction of the fiber bundle and a width direction of the fiber bundle pass-through at a most upstream fiber bundle pass-through.

* * * * *